S. HULL.

Harvester Cutter.

No. 94,826.

2 Sheets—Sheet 1.

Patented Sept. 14, 1869.

Witnesses:
R. L. Campbell
J. V. (illegible)

Inventor:
Stephen Hull

2 Sheets—Sheet 2.
S. HULL.
Harvester Cutter.
No. 94,826. Patented Sept. 14, 1869.
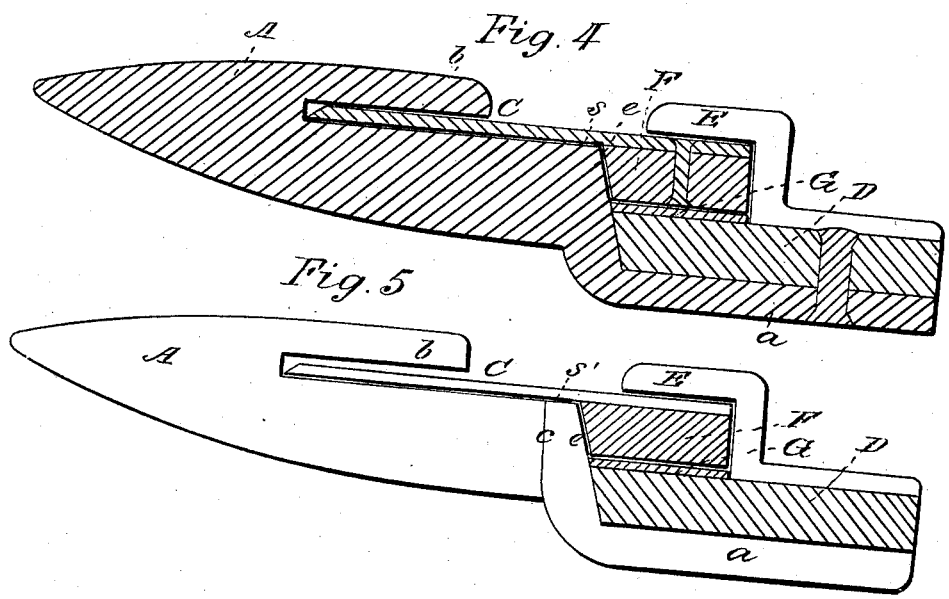
Witnesses:
Inventor:

United States Patent Office.

STEPHEN HULL, OF POUGHKEEPSIE, NEW YORK.

Letters Patent No. 94,826, dated September 14, 1869.

IMPROVEMENT IN HARVESTER-CUTTERS.

The Schedule referred to in these Letters Patent and making part of the same.

*To all whom it may concern:*

Be it known that I, STEPHEN HULL, of Poughkeepsie, in the county of Dutchess and State of New York, have invented a new and Improved Cutting Apparatus for Harvesters; and I do hereby declare that the following is a full, clear, and exact description thereof, reference being had to the accompanying drawings, making part of this specification, in which—

Figure 1:
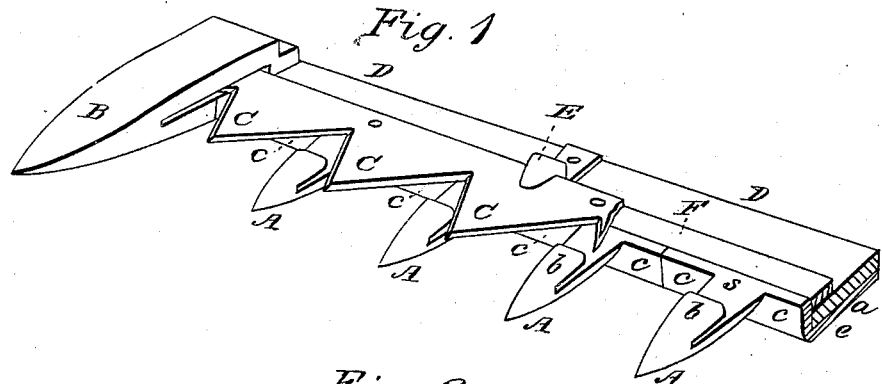

Figure 1, Sheet 1, is a perspective view of a portion of the outer end of my improved cutting apparatus.

Figure 2:
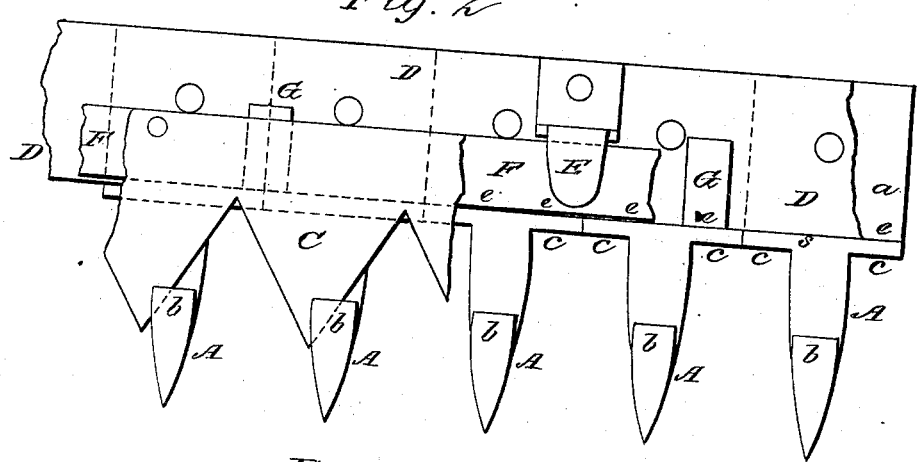

Figure 2, Sheet 1, is a top view of a portion of the cutting apparatus, with portions of the finger-bar, knife-rod, and knives broken away to expose the parts beneath them.

Figure 3:
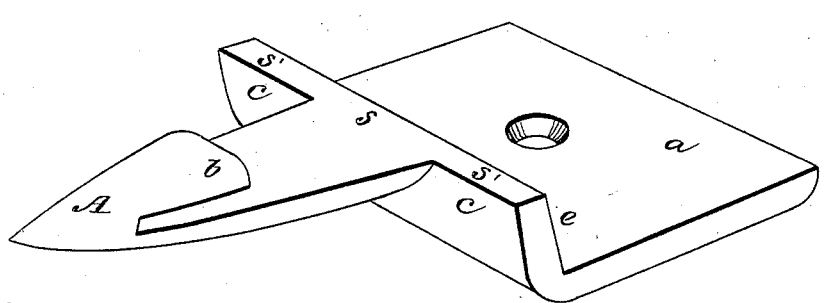

Figure 3, Sheet 1, is a perspective view of one finger.

Figure 4, Sheet 2, is a vertical cross-section through the cutting apparatus, taken longitudinally through one of the finger-bars.

Figure 5, Sheet 2, is a cross-section taken between the fingers.

Similar letters of reference indicate corresponding parts in the several figures.

The object of this invention is to improve guard-fingers for reaping and mowing machines, by so constructing the fingers that they will afford shoulder-bearings for the front edges of both the finger-bar and the knife-rod, and allow the finger-bar to be interposed between the palms or shanks of the fingers and the knife-rod, so as to form a support or bearing for the latter beneath the cutting-plane of the knives, thereby leaving an unobstructed surface over the knife-rod and finger-bar, and preventing lodgment or clogging of grass or grain, either upon the knives or below them, and at the same time stiffening the finger-bar, and sustaining the fingers in a much better manner than hitherto.

I am aware that it is not new to construct guard-fingers for the cutters of reaping and mowing machines with slots or ways in them for receiving the knife-rods below or on a level with the cutting plane of the knives; but I am not aware that prior to my invention a knife-rod has ever been arranged to work upon or over a finger-bar in rear of shoulders formed upon the front edges of the palms of guard-fingers, as will be hereinafter explained.

To enable others skilled in the art to understand my invention, I will describe one practical mode of carrying it into effect.

In the accompanying drawings, A A represent the guard-fingers; B, the outer divider; C, the knives; F, the knife-rod; D, the finger-bar, and E the back guides or angle-irons, which parts are constructed and put together as follows:

The front edges of the finger-bar D and knife-rod F both abut against a shoulder, $e$ which rises perpendicularly, or nearly so, from, and is formed on the front edge of, the shank or palm $a$ of each finger A. This shank $a$ is made somewhat wider than the width of its tooth, and its shoulder $e$ presents a front rounded or under-beveled surface, $c$, and a flat top surface, $s'\,s'$, which latter is in the plane of the knife-bearing surface $s$ of each finger, and forms a rear and lateral extension of such surface, as shown clearly in Figures 1, 2, 4, and 5.

The depressed portions $a$ of the shanks of the finger A, and also the shoulders $e$ thereof, may be equal in width to the spaces required between the fingers, so that when the fingers are secured to their bar D the edges of the said depressed portions $a$ will abut, and thus prevent any one of the fingers from lateral displacement, and also afford great stiffness to the finger-bar.

The depression of the palm or shank portion $a$ is equal to the combined thickness of the finger-bar, its wear-irons G, and the knife-rod F, so that when the latter is in place upon its wear-irons G, if these raised parts be used, its upper surface will be flush with or in the same plane as the knife-bearing surfaces $s\,s'$ on the fingers and shoulders, as shown in Figures 4 and 5, Sheet 2. This will allow the knives C to lie flatly upon the surfaces $s\,s'$, and afford substantial attachments and supports for the knives, without the formation of an obstructing surface in rear of the knives or their rod.

The only surfaces which rise above the plane of the knives are those presented by the narrow angle-pieces E, which are used to keep the front edge of the knife-rod up snugly against its shoulder $e$, and these pieces will not cause any material obstruction or lodgment of the cut product.

The wear-irons are steel pieces, which are made very narrow, and secured on top of the finger-bar D at rectangular distances apart, so as to afford supports or bearings for the knife-rod, which can be removed when worn out, and others substituted in their stead. These bearings will diminish the bearing-surface of the knife-rod, and greatly diminish friction; and while I do not confine myself to their use, I prefer to use them.

The guard-fingers are of that kind known as open guard-fingers—that is to say, have short caps $b$, which extend backward from the points of the fingers just far enough to protect the points of the knives.

The finger-bar D may be made of any suitable width, and it may be made either of wood or of metal, shaped so as to receive the rear edges of the shoulders $e$ snugly against its front edge, so that the fingers and their bar will mutually strengthen each other.

It will be seen from the above description that both the finger-bar and the knife-rod are depressed, so as to bring them beneath the knives C, and in rear of raised shoulders at the backs of the fingers A, which shoulders afford guides and bearing for the front edge of the knife-rod, and also a bearing for the front edge of the finger-bar. The finger-bar is arranged between the knife-rod F and the depressed shanks or palms $a$ of the guard-fingers A; consequently this bar may be made very light and thin, as it will be stiffened by the parts above and below it, assisted by the shoulder $e$ in front of it.

It will also be seen that I leave a clear space beneath the angular or cutting portions of the knives in front of the shoulders $e$, and under-bevel or round the front surfaces $c$ of these shoulders, so that they will pass over stubble, roots, sticks, and other like objects, without offering much resistance, or affording lodgments for anything.

Many of the cutting apparatuses hitherto used have their knives secured to rods which are seated in slots or ways made into the top surfaces of the fingers forward of the finger-bars.

These plans do offer great resistance to the progress of the machines, and also require the fingers to be made much longer and larger than is required under my improvement; consequently they are cumbersome, liable to become clogged, and, if not made very heavy, are liable to break.

Having described my invention, I desire to be understood as disclaiming the broad idea of having a knife-rod of a harvester work in a slot or way formed below the plane of cutting. I also disclaim the arrangement of a knife-rod between a shoulder formed on the front edge of the palm or shank of a guard-finger and the front edge of the finger-bar. I also disclaim the arrangement of a knife-rod arranged between shoulders formed on a guard-finger and its finger-bar.

What I claim as new, and desire to secure by Letters Patent, is—

1. An open guard-finger, A, which terminates at its rear end in a depressed palm or shank, a, having a shoulder, e, rising from its front edge to a point which is level with the bearing-surfaces of the knives, in combination with a finger-bar which is applied between said palm or shank and the knife-bar, substantially as described.

2. Adapting a depressed shoulder, which is formed at the rear end of a harvester guard-finger, to serve as a front abutment for the front edges of both the finger-bar and knife-bar, substantially as and for the purposes described.

3. The knife-bar F, arranged beneath its knives, and between depressed shoulders e and angle-irons E, which are secured to the finger-bar D, substantially as described.

4. Wear-irons G, applied upon a finger-bar which is between a knife-rod, F, and depressed finger palms or shanks a, substantially as described.

STEPHEN HULL.

Witnesses:
C. GULLMANN,
R. KENWORTHY.